United States Patent
Shmuel et al.

(10) Patent No.: US 10,797,402 B2
(45) Date of Patent: Oct. 6, 2020

(54) DEPLOYABLE ANTENNA REFLECTOR

(71) Applicant: Elta Systems Ltd., Ashdod (IL)

(72) Inventors: Amir Shmuel, Nofit (IL); Michael Kedem, Ashdod (IL)

(73) Assignee: ELTA SYSTEMS LTD., Ashdod (IL)

( * ) Notice: Subject to any disclaimer, the term of this patent is extended or adjusted under 35 U.S.C. 154(b) by 55 days.

(21) Appl. No.: 16/176,263

(22) Filed: Oct. 31, 2018

(65) Prior Publication Data

US 2019/0131714 A1    May 2, 2019

(30) Foreign Application Priority Data

Nov. 1, 2017   (IL) .......................................... 255390

(51) Int. Cl.

| | |
|---|---|
| *H01Q 15/16* | (2006.01) |
| *H01Q 15/20* | (2006.01) |
| *B64G 1/22* | (2006.01) |
| *H01Q 1/28* | (2006.01) |
| *H01Q 1/08* | (2006.01) |

(52) U.S. Cl.
CPC ........... *H01Q 15/161* (2013.01); *B64G 1/222* (2013.01); *H01Q 1/08* (2013.01); *H01Q 1/288* (2013.01); *B64G 2700/66* (2013.01)

(58) Field of Classification Search
CPC ........ H01Q 15/161; H01Q 15/16; H01Q 1/28; H01Q 1/288; H01Q 15/14; H01Q 15/147; H01Q 15/168; H01Q 15/20; H01Q 1/08
See application file for complete search history.

(56) References Cited

U.S. PATENT DOCUMENTS

| | | | |
|---|---|---|---|
| 3,337,871 A | 8/1967 | Greenberg et al. | |
| 3,680,144 A * | 7/1972 | Low .................... | H01Q 1/288 343/781 R |
| 4,527,166 A * | 7/1985 | Luly .................... | H01Q 15/161 343/840 |
| 4,613,870 A * | 9/1986 | Stonier ................ | H01Q 15/161 343/915 |
| 4,642,652 A * | 2/1987 | Herbig ................ | H01Q 15/161 343/915 |

(Continued)

FOREIGN PATENT DOCUMENTS

FR    2836451 B1    12/2004

OTHER PUBLICATIONS

Macgillivray, Charles S., "Miniature Deployable High Gain Antenna for CubeSats", The Boeing Company; Boeing Defense, Space & Security (BDS) / Phantom Works; Advanced Network & Space System Group, Apr. 22, 2011, 11 pages.

*Primary Examiner* — Tho G Phan
(74) *Attorney, Agent, or Firm* — Dorsey & Whitney LLP

(57) ABSTRACT

A reflective antenna comprising a flexible reflective sheet extending between a central hub and a perimeter edge, and a reflective sheet support mechanism comprising one or more spiral ribs articulated to the reflector sheet at least at several locations along the perimeter edge of the reflective sheet; wherein at a collapsed, stowed position of the reflective antenna the one or more spiral ribs are coiled about a common center and the reflective sheet is folded at a compact configuration, and at an expanded, deployed position the one or more spiral ribs are radially expanded and the reflective sheet is stretched over the expanded one or more spiral ribs, imparting the reflective sheet a parabolic shape.

12 Claims, 6 Drawing Sheets

(56) References Cited

U.S. PATENT DOCUMENTS

| | | | | |
|---|---|---|---|---|
| 4,899,167 | A | * | 2/1990 | Westphal ............. H01Q 15/162 343/912 |
| 5,047,788 | A | * | 9/1991 | Gillard ................. H01Q 15/147 343/721 |
| 5,421,376 | A | * | 6/1995 | Sinha .................... D03D 19/00 139/419 |
| 5,446,474 | A | * | 8/1995 | Wade ................... H01Q 15/161 343/912 |
| 5,969,695 | A | * | 10/1999 | Bassily .................... H01Q 1/08 343/912 |
| 6,930,654 | B2 | | 8/2005 | Schmid et al. |
| 8,508,430 | B2 | | 8/2013 | Palmer et al. |
| 9,496,621 | B2 | | 11/2016 | Meschini et al. |
| 9,774,092 | B2 | | 9/2017 | Fujii et al. |
| 2016/0352022 | A1 | | 12/2016 | Thomson et al. |

\* cited by examiner

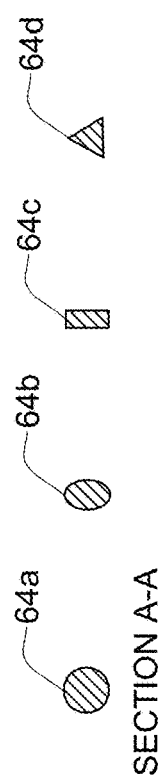
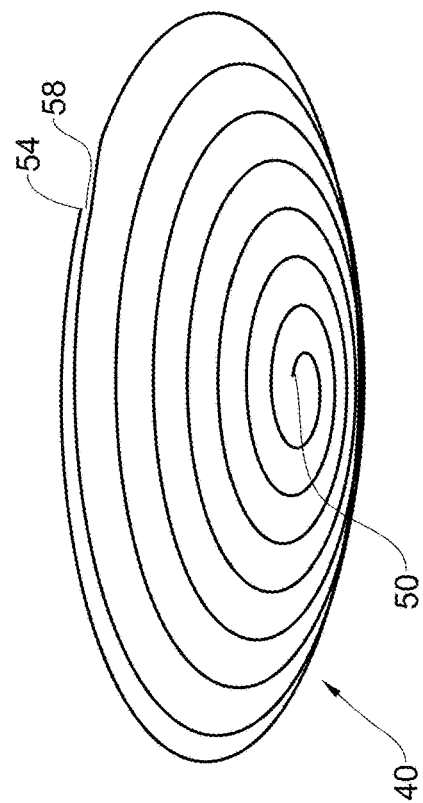
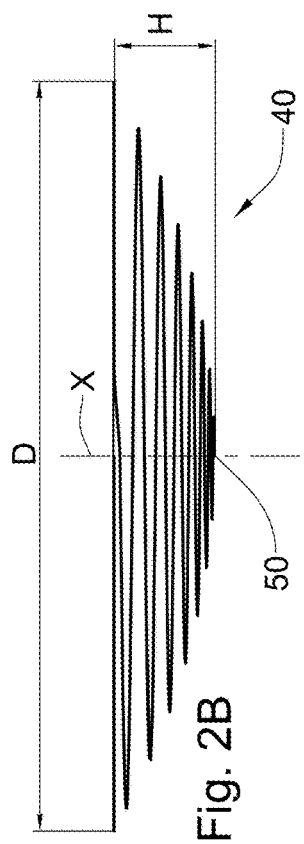
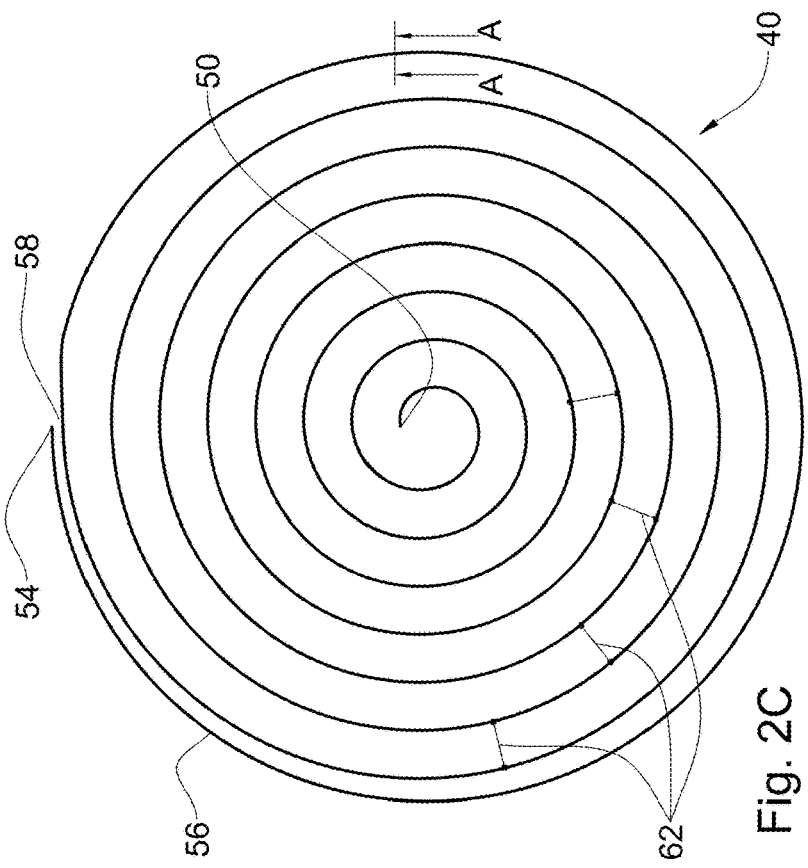
Fig. 2A
Fig. 2B
Fig. 2C
Fig. 2D

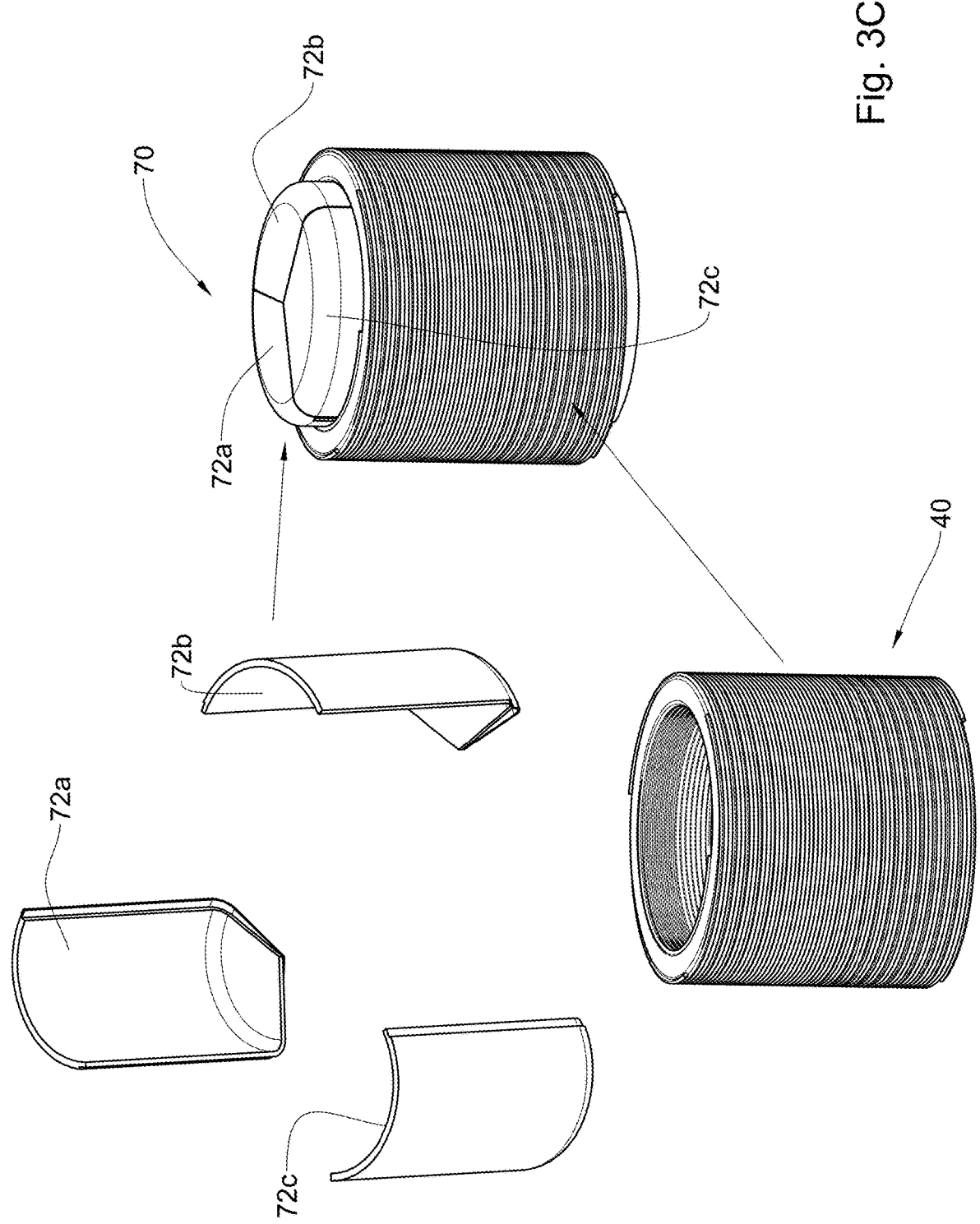

DEPLOYABLE ANTENNA REFLECTOR

CROSS-REFERENCE TO RELATED APPLICATIONS

This application claims priority to Israel Patent Application No. 255390 filed on 1 Nov. 2017, the disclosure of which is incorporated herein, in its entirety, by this reference.

TECHNOLOGICAL FIELD

The present disclosure is in the field of deployable antenna reflectors, and a method for deploying same.

BACKGROUND ART

References considered to be relevant as background to the presently disclosed subject matter are listed below:
U.S. Pat. No. 6,930,654
U.S. Pat. No. 8,508,430
U.S. Pat. No. 9,496,621
U.S. Pat. No. 9,774,092

Acknowledgement of the above references herein is not to be inferred as meaning that these are in any way relevant to the patentability of the presently disclosed subject matter.

BACKGROUND

Space oriented missions are sensitive to weight, volume and footprint of payload carried by a space platform. One of the most demanding payloads regarding these concerns are reflector antennas. The aperture of such an antenna may exceed several times the platform dimensions thus it has to be stowed compactly for launch, and then deployed in space. As satellites become smaller and lighter the cost of a launch volume and mass of a payload becomes critical, and there is a constant need to optimize these parameters, i.e. minimize the mass and stowage volume into a most compact structure.

Among the prior art references in the art, U.S. Pat. No. 6,930,654 discloses a deployable antenna reflector comprising a central dish and a plurality of deployable sheet-like panels arranged around the central dish. The reflector further comprises a central supporting body, whereon the central dish is fixedly mounted and whereto the deployable sheet-like panels are hinged. The rotation axes of the individual deployable sheet-like panels are tilted with respect to the center point of the central dish. In the stowed configuration of the reflector, the deployable sheet-like panels are at least partially deflected in order to minimize the envelope of the reflector and that the panels relax upon deployment.

U.S. Pat. No. 8,508,430 discloses an antenna reflector comprising a centrally located hub, inner ribs rotatably secured at a proximal end to the hub, outer ribs extendible from the inner ribs, and a guideline truss structure configured to support a flexible antenna reflector surface. The inner ribs are rotatable from a stowed position in which they are generally aligned with a central axis of the hub, to a rotated position in which they extend in a radial direction relative to the central axis. The guideline truss structure is secured to each outer rib using standoff cords attached at intermediate locations along a length of the outer rib between opposing ends thereof. The outer ribs are configured to be linearly displaced respectively along an elongated length of the inner ribs from a proximal position adjacent to the hub, to an extended position distal from the hub.

U.S. Pat. No. 9,496,621 discloses a large deployable reflector for an antenna suitable for being installed on board a satellite and provided with a support structure, a parabolic mirror carried by the support structure and a connection arm for mounting the support structure on the satellite; the support structure being a jointed reticulate structure that is able to assume a compact inoperative stowed configuration and an operative deployed configuration and is composed of 'n' elements articulated to form tetrahedrons having respective triangular bases, which are connected to each other at the axial ends of respective first sides and have respective external vertices, which are opposite to said respective first sides and, when the reflector is arranged in the deployed configuration, ideally lie on a cone tangent to the parabolic mirror.

U.S. Pat. No. 9,774,092 discloses a deployable antenna reflector includes a surface cable network formed of a plurality of cables coupled to each other in a mesh pattern. The surface cable network includes at least one rigid rod member that reduces a maximum tensile force caused in the surface cable network.

General Description

Communication satellites require deployable antenna reflectors which can be stowed during launch on a satellite in a minimized available envelope and are deployed during mission.

According to the present disclosure there is provided a reflective antenna comprising a flexible reflective sheet extending between a central hub and a perimeter edge, and a reflective sheet support mechanism comprising one or more spiral ribs articulated to the reflector sheet at least at several locations along the perimeter edge of the reflective sheet; wherein at a collapsed, stowed position of the reflective antenna the one or more spiral ribs are coiled about a common center and the reflective sheet is folded at a compact configuration, and at an expanded, deployed position the one or more spiral ribs are radially expanded and the reflective sheet is stretched over the expanded one or more spiral ribs, imparting the reflective sheet a pre-defined shape.

The reflective antenna can further be configured with a feed assembly articulated to a hub positioned at a center of the reflective sheet.

The reflective antenna is further configured with a deploying mechanism for manipulating the one or more spiral ribs between the stowed position and the deployed position, thereby deploying the reflective antenna into its deployed, operative position.

The shape of the reflective antenna at its deployed position is imparted by the initial, pre-shaped form of the reflective panel, wherein the reflective panel support mechanism serves to deploy, tension and maintain the reflective panel at said deployed position.

Any one or more of the following features, designs and configurations, can be implemented in a reflective antenna according to the present disclosure, individually or in various combinations thereof:
  the reflective sheet support mechanism can be disposed on either, or both, of an inside and an outside face of the reflective sheet;
  the reflective sheet can comprise two or more layers of sheet material, wherein the reflective sheet support mechanism can be disposed between layers of the reflective sheet;
  the one or more spiral ribs of the reflective sheet support mechanism are wires;
  the wires of the one or more spiral ribs can have flat, or round (circular, oval) or polygonal cross section;

at the collapsed position the one or more spiral ribs can be coiled about a common center;

at the collapsed position the one or more spiral ribs can be coiled at a round plane extending along a central axis of the reflective antenna;

at the collapsed position the one or more spiral ribs can be coiled into a cylindrical shape, or a conical shape, having an axis extending along a central axis of the reflective antenna;

at the collapsed position the one or more spiral ribs can be tensioned and are restrained so as to be prevented from spontaneous deforming into the deployed position;

the reflective sheet support mechanism can be configured of a single spiral rib, coiled about itself, and wherein at the deployed position a most distal coil of the spiral rib is articulated at a plurality of locations to the perimeter edge of the reflective sheet;

the reflective sheet can be fixedly attached to locations of the one or more spiral ribs; one or more attachments of the reflective sheet to the one or more spiral ribs can be floating attachments, facilitating sliding displacement of the reflective sheet with respect to the spiral ribs;

neighboring coils of the one or more spiral ribs can be secured to one another by flexible connectors, configured for setting radial distance between neighboring coils;

the reflective sheet can be pre-formed at a desired shape, wherein at the deployed position it is tensioned to assume said pre-formed shape;

the reflective sheet can be dome-shaped;

at the deployed position the reflective sheet can assume a dish-like shape;

at the deployed position the reflective sheet can assume a parabolic shape;

the reflective sheet can be made of a substantially non-stretchable material;

at least an inside face of the reflective sheet can be made of, or coated with, reflective layer;

the reflective sheet can be configured with optical reflection properties or with electromagnetic reflective properties;

the reflective sheet can be a mesh-like material, or comprise mesh-like portions;

the reflective sheet support mechanism can be made of spring wire made of spring metal such as Titanium or stainless steel;

at the stowed position, the one or more spiral ribs can be maintained below the plastic deformation zone, to prevent constant deformation thereof;

the deploying mechanism can be a mechanical arresting unit configured for arresting the one or more spiral ribs at their collapsed, coiled position, while under tension, and upon receiving a deployment signal the arresting unit discharges the one or more spiral ribs into their expanded position;

the reflective sheet support mechanism can be made of a shape memory material wherein at a first memory position corresponds with the collapsed position, and a second memory position corresponds with the deployed position;

the reflective sheet support mechanism can be a two-phase alloy wherein a first phase position corresponds with the collapsed position, and a second phase position corresponds with the deployed position;

the shape memory material can be temperature activated, so that at a predetermined temperature it deforms from its collapsed position into its deployed position;

the two-phase alloy can be made for example of Nitinol;

the two-phase alloy can be made for example of composite material such as Silicon Rubber loaded by several threads of non-stretchable material like metal or fiber carbon or carbon nano-tubes;

the deploying mechanism can be electrical current inducing heat to the shape memory material of the reflective sheet support mechanism;

the reflective sheet support mechanism can be configured of an enhanced structure of two or more the previous options;

the reflective sheet support mechanism can be composed of several wires;

the one or more spiral ribs of the reflective sheet support mechanism can be arranged in a triangular section-like grid and interleaving fixes, thus enhancing the force exerted by thin wires;

at the stowed position the reflective antenna can be stowed within a capsule;

the capsule can be configured of two or more segments;

the reflective antenna can be removed from the capsule by a pyrotechnic mechanism removing the reflective antenna from the capsule, a pyrotechnic mechanism destroying the capsule, a retraction mechanism for withdrawing the reflective antenna from the capsule;

the capsule can be a closed structure or a grid-like container, configured for maintaining the reflective antenna at a compact stowed position;

deploying the reflective antenna into its expanded position can take place gradually, so as to avoid importing the deploying reflective antenna with significant moment of inertia;

a radially distal coil of a single spiral rib can extend circularly disposed in conformity with the perimeter edge of the reflective sheet;

a radially distal portion of each one of one or more spiral ribs can extend tangent with radially distal portions of neighboring spiral ribs, and in conformity with the perimeter edge of the reflective sheet.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIG. 2A is a perspective view of a single-coiled reflective sheet support mechanism, at a deployed position;

FIG. 2B is a side view of FIG. 2A;

FIG. 2C is a planar top view of FIG. 2A;

FIG. 2D illustrates several options of cross-sections of a coil of the reflective sheet support mechanism, along line A-A in FIG. 2A;

FIG. 3C is a perspective view of a coiled reflective sheet support mechanism mounted over an inside support capsule, at a stowed position thereof;

DETAILED DESCRIPTION OF EMBODIMENTS

Figure 1:
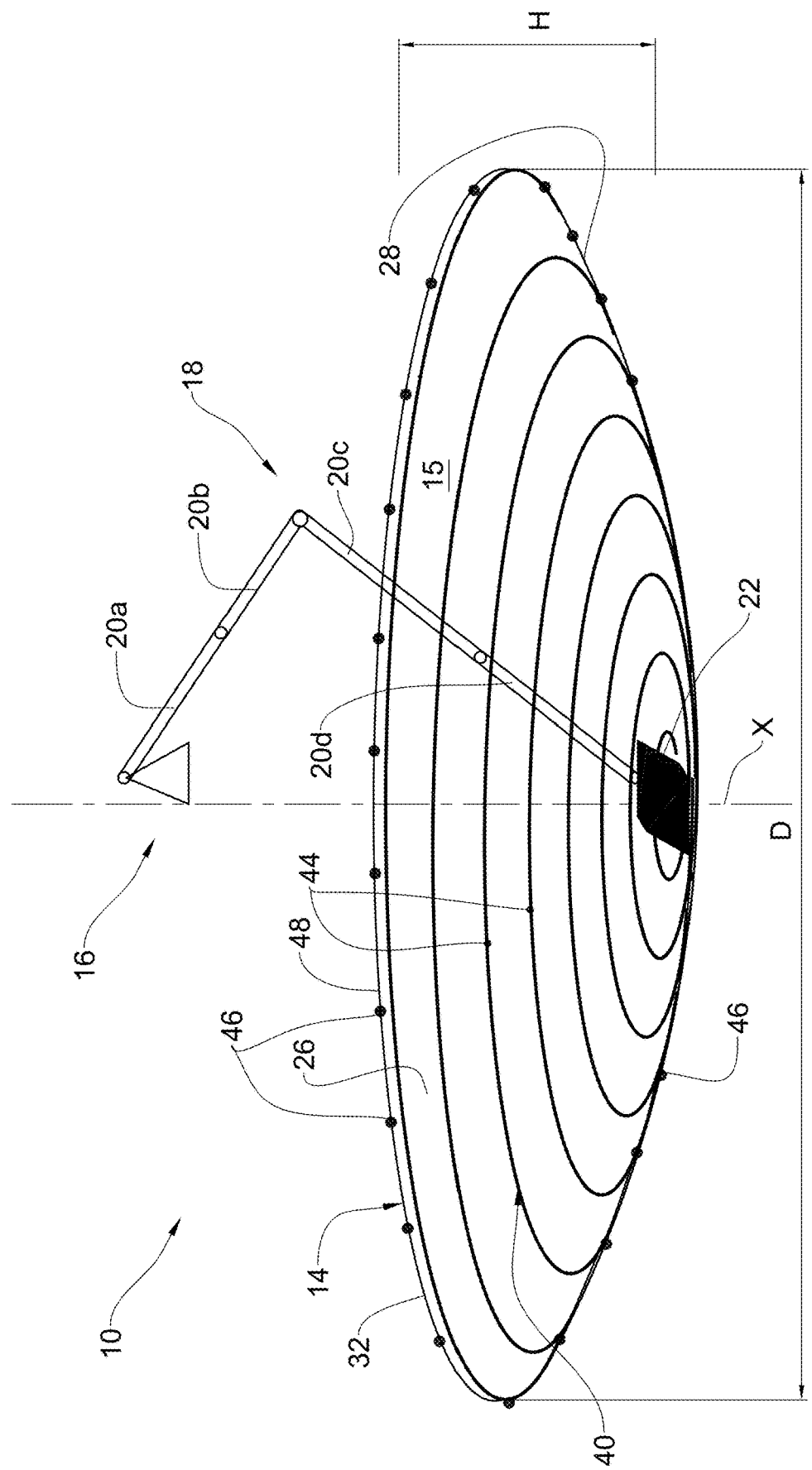
FIG. 1 is schematic perspective view of a reflective antenna according to an example of the present disclosure, at a deployed position.

Attention is first directed to FIG. 1 of the drawings illustrating a reflective antenna according to an example of the disclosure, generally designated 10, the reflective antenna illustrated at its deployed, operative position, and in the illustrated example comprises a reflective sheet 14, with a feed assembly 16 supported by a support arm 18, extending from a central hub 22 (which can be a rigid member) of the reflector antenna 10. The reflective antenna is a dish shaped antenna having a central axis X, and at the deployed position having a large diameter D and a height H.

The support arm 18 comprises several links 20a, 20b, 20c and 20d pivotally secured to one another, to create a support arm manipulable between a collapsed, stowed position (not shown), and a deployed, operative position (as seen in FIG. 1). It is however appreciated that the feed assembly 16 does constitute part of the disclosure, and this can be configured in various configuration.

The reflective sheet 14 is a dome-shaped member made of flexible though non-stretchable sheet material 15, and can be made of a single sheet material or a multi-layer sheet material. For example, the reflective sheet 14 can be made of carbon fibers and it can be coated with different materials, such as polymeric materials, etc. The sheet material 15 can be solid (non-porous) material or a mesh-like sheet, with an inside face 26 and an outside face 28, where at least the inside face 26 is coated with or made of reflective material. The sheet material 15 extends from the central hub 22 towards a perimeter edge 32.

The reflective antenna 10 is further configured with a reflective sheet support mechanism generally designated 40, which in the present example is a single-wired spiral rib originating from the central hub 22 and terminating along the perimeter edge 32 of the sheet material 15. The sheet material 15 is secured at locations 46 to the most radial distal spiral rib 48, not leaving slack edges of the sheet material 15.

It is appreciated that the securing locations 46 can be fixed ones, i.e. whereby the sheet material 15 is fixedly secured to the respective locations of the coiled rib 40, or the articulation can be a 'floating' one, i.e. wherein the sheet material 15 can slightly displace with respect to the coiled rib 40. Additional securing locations can be configured between the sheet material 15 and the coiled rib 40, e.g. locations 44.

FIGS. 2A to 2C illustrate the reflective sheet support mechanism, namely coiled rib 40, isolated from the reflective sheet 14, and as can be seen, the coiled rib is a single coil, spiraling from a center point of origin 50 (corresponding with the location of the central hub and configured for articulation thereto), terminating at location 54, wherein the radial distal coil 56 is deformed 58 so as to give rise to an almost complete circular path of said radial distal coil 56, having dimensions (diameter D and height H) corresponding with those of the domed sheet material 15.

In the illustrated example, the coils of the coiled rib 40 are equally spaced from one another, though according to other example the coils can be non-equally distributed. Furthermore, some or all of the coils can be secured to one another, for example by flexible restricting members 62 (shown only in FIG. 2C), or by coupling respective locations of the coils to the sheet material 15.

The reflective sheet support mechanism, namely coiled rib 40 can be configured of a spring wire, e.g. made of Titanium, stainless steel, etc. and can have different cross sections, e.g. round 64a, oval 64b, flat 64c, triangular 64d, etc. (FIG. 2D). as will be discussed hereinafter, the reflective sheet support mechanism can be made of shape memory material.

The reflective sheet support mechanism, namely coiled rib 40, can be applied over the inside face 26 or the outside face 28, or it can be embedded between layers of the sheet material 15. As an option, where increased stability is required, a reflective sheet support mechanism can be applied over both the inside face and the outside face (not shown).

Figure 3B:
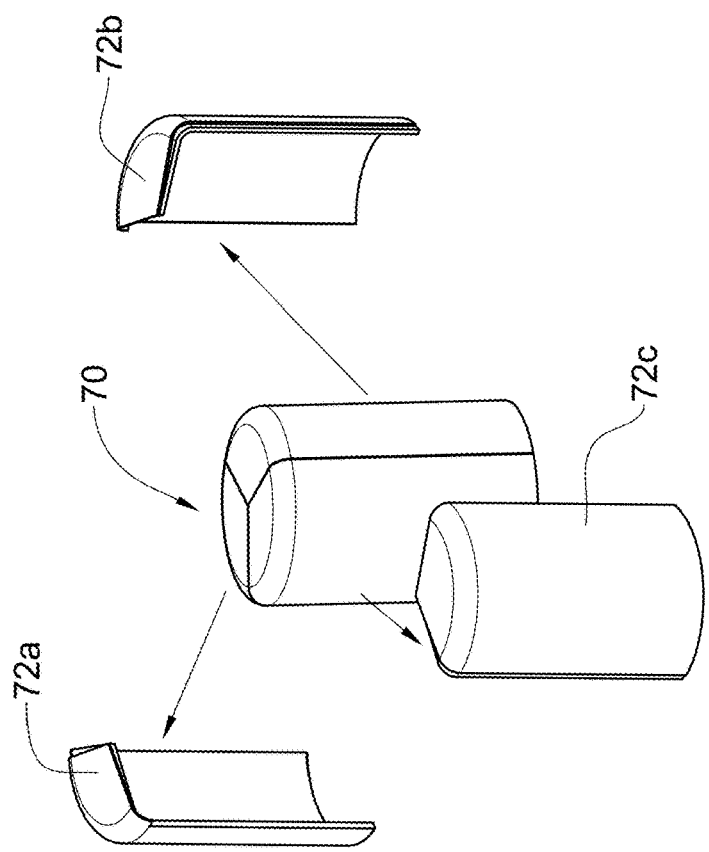
FIG. 3B is an exploded perspective view of the stowing capsule illustrated in FIG. 3A.
Figure 3A:
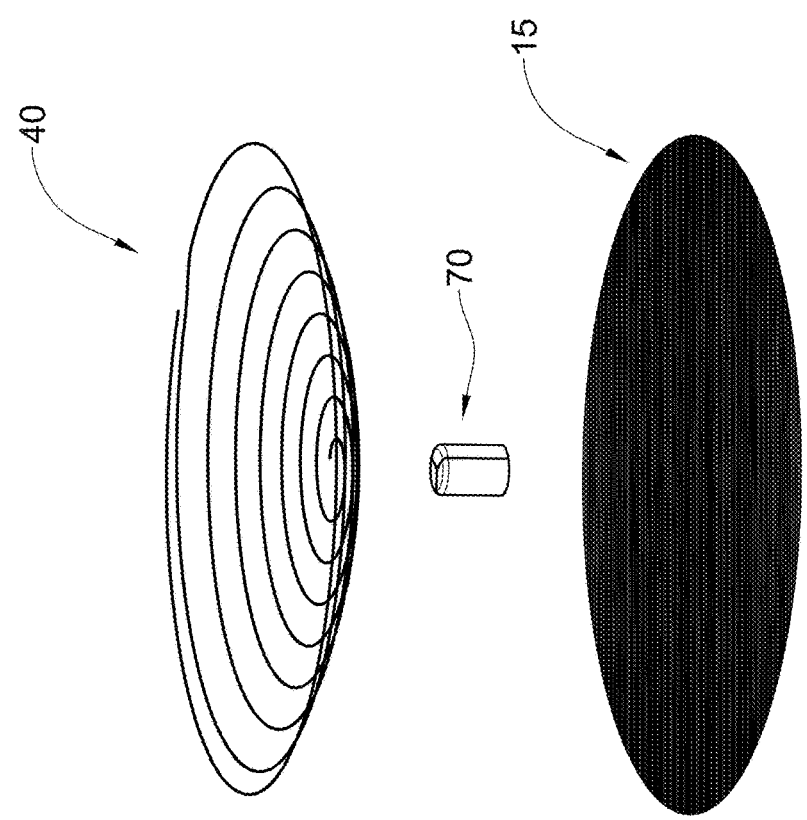
FIG. 3A is an exploded perspective view of a reflective antenna of the disclosure, and a stowing capsule therefore.

FIGS. 3A and 3B schematically illustrate how a reflective sheet according to the disclosure is maintained at its stowed, compacted position, wherein the reflective sheet 14 is encapsulated within a cylindrical capsule 70 and the reflective sheet support mechanism 40 is wound (i.e. coiled) over the capsule 70. The arrangement is such that there may be an external stow capsule (not shown), encapsulating the entire assembly. In the illustrated example the capsule 70 is configured of three segments 72a, 72b and 72c symmetrically disposed to give rise to a closed capsule. Deploying the reflective sheet from the capsule can be facilitated by a pyrotechnic arrangement (not shown) whereby triggering same results in scattering the segments 72a, 72b and 72c, thus enabling the reflective sheet to expand into its deployed position, as will be discussed herein below. Other arrangements can be configured for deploying the reflective sheet from the capsule, such as mechanical withdrawal from capsule, magnetic arrangements, heat dissolving, etc. (not shown).

Once deployed from the retention capsule, the reflective sheet support mechanism is triggered to expand into its fully deployed position. For example, in case of a coiled spring rib, it may be sufficient to discharge the coiled rib from the retaining capsule thus allowing it to spontaneously spring out owing to elasticity thereof.

However, in case of a memory shape coiled rib, it is required to heat the coiled rib for it to assume its second shape (namely the deployed shape). Heating can be facilitated by applying an electric current through the coiled rib. Electric current can be provided through the central hub 22 of the reflective sheet 14.

Figure 4C:
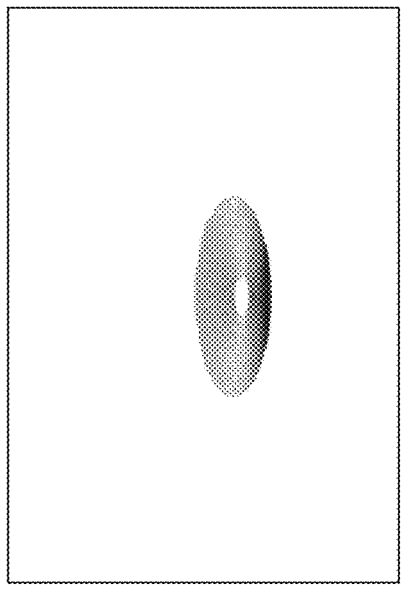
FIGS. 4A to 4E are consecutive deployment steps of a single coiled reflective sheet support mechanism.
Figure 4B:
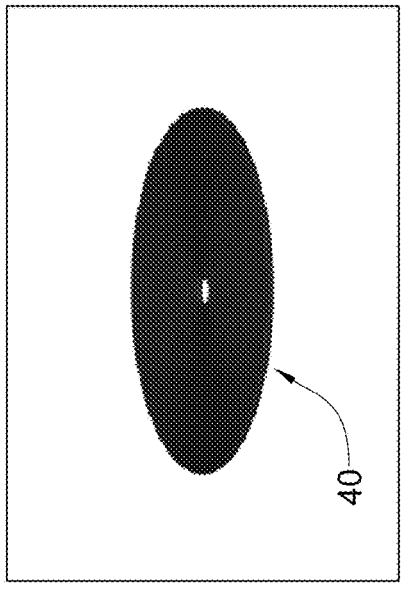
Figure 4E:
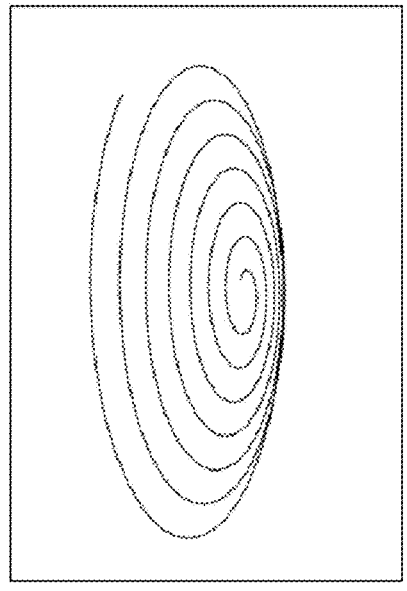
Figure 4A:
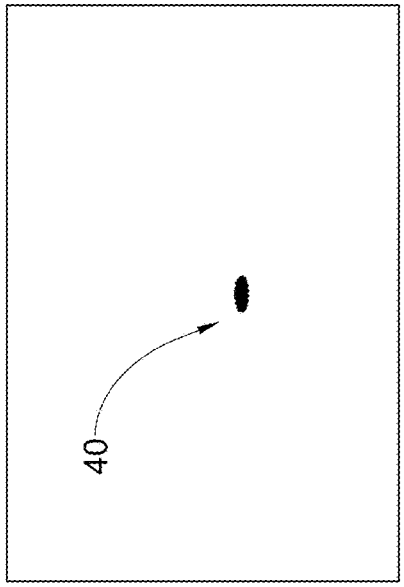
Figure 4D:
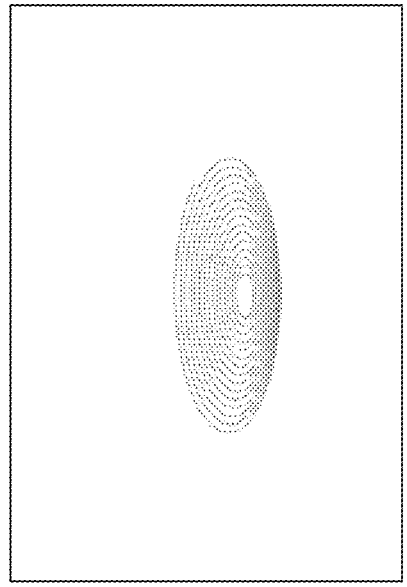

FIGS. 4A to 4E illustrate consecutive steps of deployment of the coiled spiral rib 40 from a stowed, substantially flat position wherein the coiled spiral is tensioned around a minimal diameter (FIG. 4A). Upon initial deploying, the coiled rib radially expands (FIG. 4B) and gradually assumes its final shape, fully radially expanded and domed (FIGS. 4C to 4E).

Figure 5:
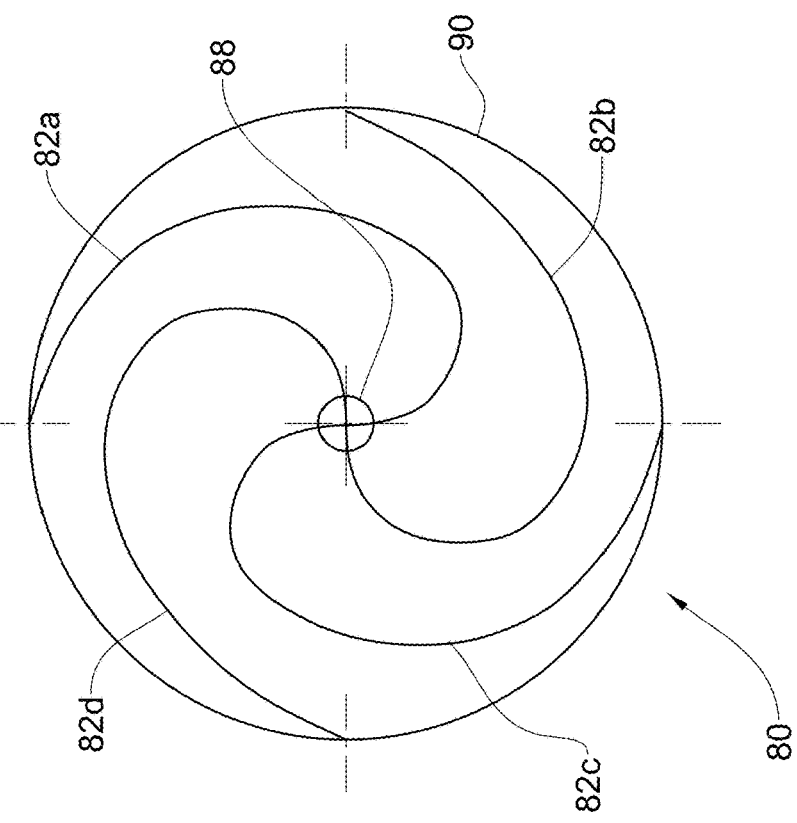
FIG. 5 is a schematic example of a of a reflective sheet support mechanism, at a deployed position, configured of 4 partial coils.

In the example of FIG. 5 there is schematically illustrated a reflective sheet support mechanism generally designated 80, comprising four spiral ribs 82a, 82b, 82c and 82d, all extending from a central hub 88 and being substantially equally angularly separated from one another, each having a distal radial end extending tangent at a radius corresponding with the perimeter edge of the sheet (not shown). It is appreciated that the number of spiral ribs and their length can vary according to different configurations.

Figure 6:
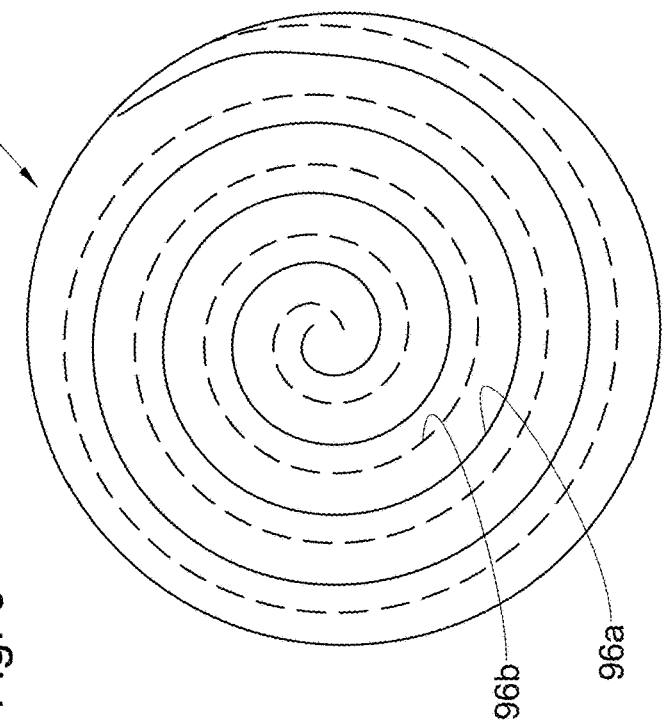
FIG. 6 is yet a schematic example of a of a reflective sheet support mechanism, at a deployed position, configured of two full coils.

In FIG. 6 there is schematically illustrated yet an example of a reflective sheet support mechanism generally designated 94, comprising two spiral ribs 96a and 96b coiled over one another, with coiled rib 96a extending radially distally to meet the distal diameter corresponding with nominal diameter D of the reflective sheet (not shown). The coils 96a and 96b can be loose or articulated to one another at least at several locations, thereby increasing their tension module.

Figure 7:
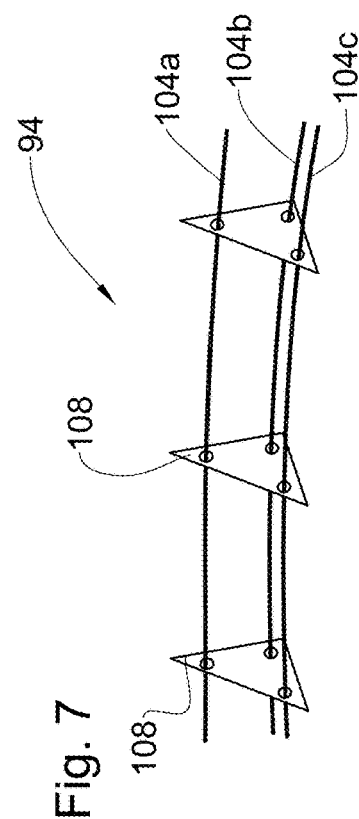
FIG. 7 is a segment of a reflective sheet support mechanism according to another configuration of the present disclosure.

In FIG. 7 there is schematically illustrated a segment of a reflective sheet support mechanism 102, i.e. a portion of a spiral rib, composed of three parallely extending ribs 104a, 104b and 104c. The three ribs maintain their respective position by a plurality of triangular support spacers 108. This arrangement yields a reflective sheet support mechanism of improved strength, moment of inertia and elasticity.

The invention claimed is:

1. A reflective antenna, comprising:
    a flexible reflective sheet extending between a central hub and a perimeter edge; and
    a reflective sheet support mechanism comprising one or more spiral ribs, wherein at least one of the one or more spiral ribs is articulated to the flexible reflective sheet at least at several locations along the perimeter edge of the flexible reflective sheet;
    wherein at a collapsed, stowed position of the reflective antenna, the one or more spiral ribs are coiled about a common center and the flexible reflective sheet is folded at a compact configuration; and
    wherein at an expanded, deployed position of the reflective antenna, the one or more spiral ribs are radially expanded and the flexible reflective sheet is stretched over the expanded one or more spiral ribs, imparting to the flexible reflective sheet a parabolic shape.

2. The reflective antenna of claim 1, further comprising:
    a deploying mechanism for manipulating the one or more spiral ribs between the stowed position and the deployed position, thereby deploying the reflective antenna into the deployed position.

3. The reflective antenna of claim 2, wherein the deploying mechanism includes a mechanical arresting unit configured for arresting the one or more spiral ribs at the collapsed, stowed position thereof, while under tension; and wherein upon receiving a deployment signal, the mechanical arresting unit is configured to discharge the one or more spiral ribs into the expanded, deployed position.

4. The reflective antenna of claim 1, wherein the reflective sheet support mechanism is configured to be disposed on either, or both, of an inside face and an outside face of the flexible reflective sheet.

5. The reflective antenna of claim 1, wherein the flexible reflective sheet comprises two or more layers of sheet material, wherein the reflective sheet support mechanism is disposed between the two or more layers of sheet material of the flexible reflective sheet.

6. The reflective antenna of claim 1, wherein the one or more spiral ribs of the reflective sheet support mechanism are wires.

7. The reflective antenna of claim 1, wherein at the collapsed, stowed position, the one or more spiral ribs are coiled at a round plane extending along a central axis of the reflective antenna.

8. The reflective antenna of claim 1, wherein at the collapsed, stowed position, the one or more spiral ribs are coiled into a cylindrical shape or a conical shape, having an axis extending along a central axis of the reflective antenna.

9. The reflective antenna of claim 1, wherein at the collapsed, stowed position, the one or more spiral ribs are tensioned and are restrained so as to be prevented from spontaneous deforming into the deployed position.

10. The reflective antenna of claim 1, wherein the reflective sheet support mechanism is configured of a single spiral rib, coiled about itself; and wherein at the deployed position, a most distal coil of the single spiral rib is articulated at a plurality of locations to the perimeter edge of the flexible reflective sheet.

11. The reflective antenna of claim 1, wherein articulation of the flexible reflective sheet to the at least one of the one or more spiral ribs is via floating attachments, facilitating sliding displacement of the flexible reflective sheet with respect to the at least one of the one or more spiral ribs.

12. The reflective antenna of claim 1, wherein the flexible reflective sheet is pre- formed at a desired shape; and wherein at the deployed position, the flexible reflective sheet is tensioned to assume the desired shape.

* * * * *